(12) United States Patent
Kim et al.

(10) Patent No.: US 7,172,325 B2
(45) Date of Patent: Feb. 6, 2007

(54) BACKLIGHT UNIT OF LIQUID CRYSTAL DISPLAY

(75) Inventors: Hyung Suk Kim, Suwon (KR); Young Sam Park, Seoul (KR); Hun Joo Hahm, Sungnam (KR); Jung Kyu Park, Suwon (KR); Young June Jeong, Suwon (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 203 days.

(21) Appl. No.: 10/916,480

(22) Filed: Aug. 12, 2004

(65) Prior Publication Data
US 2005/0276066 A1  Dec. 15, 2005

(30) Foreign Application Priority Data
May 28, 2004  (KR)  ............ 10-2004-0038438

(51) Int. Cl.
*F21V 5/04*  (2006.01)

(52) U.S. Cl. ............ 362/561; 362/237; 362/308; 362/800

(58) Field of Classification Search ............ 362/561, 362/555, 227, 230, 231, 235, 236, 237, 238, 362/240, 241, 245, 247, 294, 373, 800, 308, 362/309, 330, 335, 559, 560; 257/98
See application file for complete search history.

(56) References Cited

U.S. PATENT DOCUMENTS

| | | | |
|---|---|---|---|
| 6,679,621 B2 | 1/2004 | West et al. | 362/327 |
| 6,871,982 B2 * | 3/2005 | Holman et al. | 362/331 |
| 6,964,489 B2 * | 11/2005 | Blume et al. | 362/27 |

* cited by examiner

*Primary Examiner*—Sandra O'Shea
*Assistant Examiner*—Bao Q. Truong
(74) *Attorney, Agent, or Firm*—Lowe Hauptman & Berner, LLP.

(57) ABSTRACT

A backlight unit of a liquid crystal display includes a plurality of light emitting diode packages arranged in a matrix while being spaced a uniform distance apart from each other. Each light emitting diode package includes one or more light emitting diode chips and is structured such that light generated from the light emitting chips is emitted in the horizontal direction. A reflector consists of a plurality of reflection cells connected to each other in a matrix. Each of the reflection cells of a unit size has each of the light generating packages positioned at the center thereof, and reflects the light, emitted from the light emitting diode at the center thereof in the horizontal direction, in the vertical direction.

11 Claims, 3 Drawing Sheets

BACKLIGHT UNIT OF LIQUID CRYSTAL DISPLAY

RELATED APPLICATIONS

The present application is based on, and claims priority from, Korean Application Number 2004-38438, filed May 28, 2004, the disclosure of which is hereby incorporated by reference herein in its entirety.

BACKGROUND OF THE INVENTION

1. Field of the Invention

The present invention relates to a backlight unit of a liquid crystal display (LCD), and more particularly to a backlight unit of a liquid crystal display, which has a structure commonly applicable to any size of LCDs, and can be structured with a smaller number of light emitting diodes.

2. Description of the Related Art

A light emitting diode (LED) is a semiconductor light emitting device, which emits various colors of light, with light source being constituted by compound semiconductors made of various materials, such as GaAs, AlGaAs, GaN, InGaN and AlGaInP. With the advent of highly efficient three primary colors (red, blue, green) and white LEDs realized by a nitride having excellent physical and chemical properties, the LEDs have more diverse applications. For instance, the LEDs are used in various applications, such as a backlight of a keypad or a liquid crystal display, a signal lamp, a guide lamp at a landing strip of an airport, a highly directional reading lamp in an airplane or a vehicle, street lighting, and the like.

As a standard for determining characteristics of the LEDs, colors, brightness, intensity of light, and the like, of the LEDs can, be used, and these are determined primarily by the material of the compound semiconductor for the LEDs, and secondarily by a package structure for mounting LED chips.

FIGS. 1a and 1b are a perspective view and a section side elevation illustrating an LED device used as a light source for a conventional backlight.

Referring to FIGS. 1a and 1b, an LED device 10 comprises a lead line 12 for inputting or outputting an electrical signal, a frame 11 made of a plastic material and being provided with a thermally conductive material therein, an LED chip 14 mounted on the frame 11, and a lens 16 coupled to the frame 11 at the top surface of the frame 11 while being structured such that light generated from the LED chip 14 can be reflected to the horizontal direction.

The lens 16 has a pyramidal shape attached on a semi-spherical shape, and acts to refract light emitted in any direction from the LED chip 14 located at the center of the top surface on the frame 11 to the horizontal direction.

The package structure consisting of the frame 11 and the lens 16 is structured such that the light generated from the LED chip 14 is emitted approximately in the horizontal direction while heat generated from the LED chip 14 is dissipated to the outside, thereby providing stable operation characteristics to the LED device 10.

The above LED device 10 is a spot light source. Thus, in order to realize surface emission with the spot light sources, a separate structure is required. With regard to this, a structure, wherein an LED array with a plurality of LED devices 10 arranged in a line therein is mounted at the center of a reflection plate having a semi-cylindrical shape, thereby realizing the surface emission through the reflection plate, has been conventionally provided.

FIG. 2 shows a conventional backlight unit using the LED device 10 having the horizontal light emitting characteristics as described above, and FIG. 3 is an enlarged view of an LED array 21 provided in the backlight unit shown in FIG. 2.

As shown in FIGS. 2 and 3, the backlight unit 30 comprises: an LED array module 20 including a plurality of LED devices 10, each of which is packaged as shown in FIG. 1 while emitting one color among red, blue and green colors; a printed circuit board (PCB) 21 with printed circuit patterns for transmitting an electrical signal formed thereon and for mounting the plurality of LED devices 10 in a line thereon such that three colors can be alternately emitted; and a reflection plate 31 having a semi-cylindrical shape, in which the LED array module 20 is located at the center of the reflection plate 31. The PCB 30 of the array module 21 is preferably made of Al, which has good thermal conductivity in order to enhance heat dissipation efficiency.

The backlight unit 30 realizes surface emission over all ranges of an LCD screen by totally reflecting the light, emitted from the respective LED devices mounted on the LED array module 20 in the horizontal direction, in the perpendicular direction through the reflection plate 31.

The number of the LED array modules 20 required for the backlight unit having the structure as described above is increased in proportion to the screen size of the LCD display, which uses the LED array modules. Further, the number of the LED devices 10 required for each of the LED array modules 20 is also increased in proportion to the screen size of the LCD display using the LED array modules.

As described above, the conventional backlight unit has problems in that the LED array module 21 and the reflection plate 23 must be redesigned according to the screen size of the LCD display, and in that the number of the expensive LED devices 10 is increased in proportion to the screen size of the LCD display.

Moreover, since the independently packaged red, blue and green LED devices are mounted on the PCB 21 in the conventional backlight unit, power must be separately applied to the respective red, blue and green LED devices, and three colors of the light emitted from the LED devices 10 are mixed at the outside. Thus, in order to adequately mix the three colors emitted from the LED devices 10, it is necessary to provide a space for mixing, thereby providing a thick LCD display.

Further, since the plurality of LED devices 10 are linearly arranged to form a linear emitting source, length of the LED array module is determined based on the screen size of the LCD. Accordingly, as the screen size of the LCD is increased, not only is the number of the LED devices 10 for one LED array module 20 increased, but the size of the expensive aluminum PCB 21 is also increased. Thus, there are problems in that the conventional LCD has inefficiency in view of manufacturing costs, and in that as additional PCBs 21 must be provided according to the screen size of the LCD, the LED devices 10 are not commonly applicable.

Further, the conventional LED device 10 refracts light in the horizontal direction using difference of the refraction rates of the lens 13 and other media. Accordingly, since the light generated from the center of the LED in a direction to an upper portion of the LED is transmitted without having its direction changed, there can occur a hot spot at the center of the LED device, thereby requiring a shadow sheet for the backlight unit 30 in order to prevent the hot spot from being generated. Additionally, since the conventional backlight unit adopts a 1-chip per 1-package structure wherein the LED device packages one chip, it is not price competitive.

SUMMARY OF THE INVENTION

The present invention has been made in view of the above problems, and it is an object of the present invention to provide a backlight unit of a liquid crystal display, which has a structure commonly applicable to any size of liquid crystal displays, and can be structured with a smaller number of light emitting diodes.

In accordance with one aspect of the present invention, the above and other objects can be accomplished by the provision of a backlight unit of a liquid crystal display, comprising: a plurality of light emitting diode packages arranged in a matrix while being spaced a uniform distance apart from each other, each light emitting diode package including one or more light emitting diode chips and structured such that light generated from the light emitting chips is emitted in the horizontal direction; and a reflector consisting of a plurality of reflection cells connected to each other in a matrix, each of the reflection cells having each of the light generating packages positioned at the center of each of the reflection cells, having a unit size, and reflecting the light emitted from the light emitting diode at the center thereof in the horizontal direction to the perpendicular direction.

Further, each of the reflection cells in the reflector may be formed, at the center thereof, with a hole having a predetermined size, and each of the light emitting diode packages may be inserted into the hole.

Each of the light emitting diode packages may comprise: a printed circuit board with a conductive patterns for transmitting power formed thereon; a base located on the printed circuit board and having a heat dissipation function for transmitting heat to the printed circuit board; one or more light emitting diode chips mounted on the base and electrically connected to the conductive pattern of the printed circuit board; and a lens formed on the base for changing path of the light generated from the plurality of light emitting diode chips to the horizontal direction.

The lens may be formed with a reflective surface having a spherical surface shape, at an upper portion of the lens in the perpendicular direction above the plurality of light emitting diode chips, and reflecting the light emitted from the light emitting diode chips in the perpendicular direction to the lateral direction. The reflective surface of the lens may be achieved by coating a reflective material on an upper surface of the lens after the upper surface of the lens is defined to have the spherical surface shape.

In accordance with another aspect of the present invention, there is provided a backlight unit of a liquid crystal display, comprising a plurality of unit backlight cells connected to each other in a matrix, each of the plurality of unit backlight cells integrally comprising: a printed circuit board having a conductive pattern for transmitting power formed thereon, one or more light emitting diode chips electrically connected to the conductive pattern on the printed circuit board, a lens for changing path of light generated from the light emitting diode chips to the horizontal direction, and a reflector formed to surround the lens and having an unit size for reflecting the light refracted in the horizontal direction through the lens to the perpendicular direction.

For the backlight unit according to another aspect of the present invention, the lens may be formed with a reflective surface having a spherical surface shape, at an upper portion of the lens in the perpendicular direction above the plurality of light emitting diode chips, and reflecting the light emitted from the light emitting diode chips in the perpendicular direction to the lateral direction. Further, the reflective surface of the lens may be achieved by coating a reflective material on an upper surface of the lens after the upper surface of the lens is defined to have the spherical surface shape.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now preferred embodiments of the present invention will be described in detail with reference to the accompanying drawings so that those skilled in the art may easily understand and repeat the present invention.

Figure 1A:
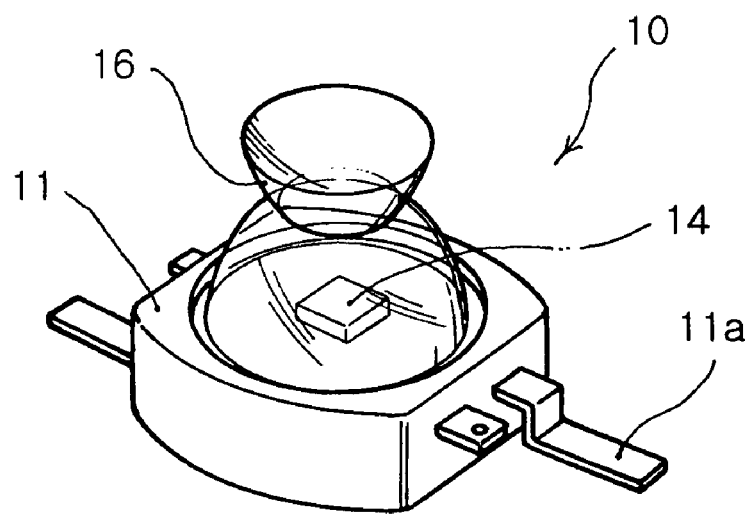
FIGS. 1a and 1b are a perspective view and a section side elevation illustrating a package structure of a conventional light emitting diode device.
Figure 1B:
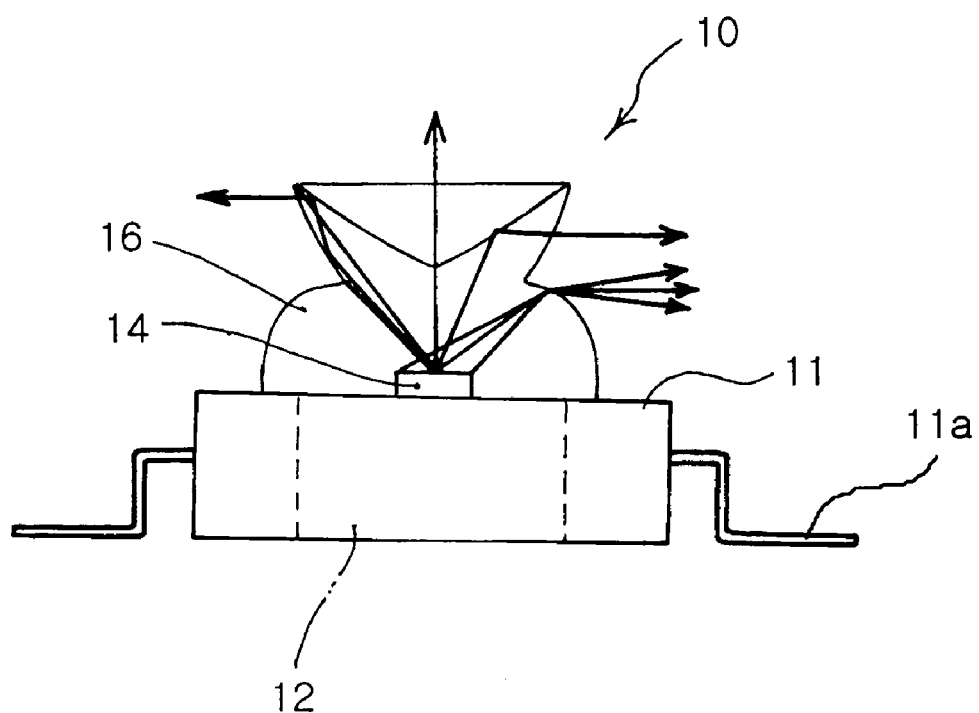
Figure 2:
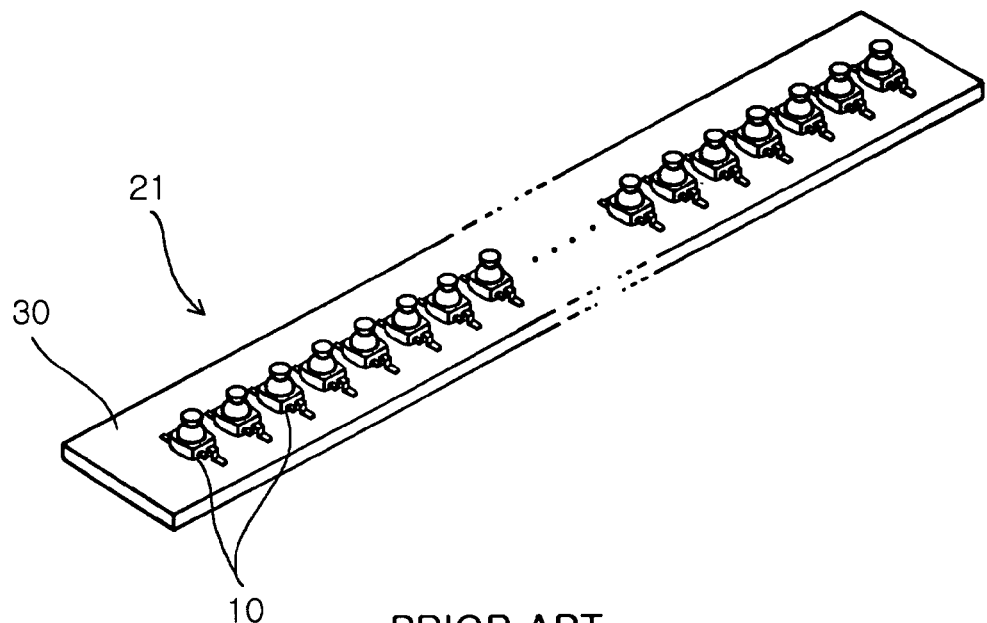
FIG. 2 is a perspective view showing an LED array module realized by the conventional LED device.
Figure 3:
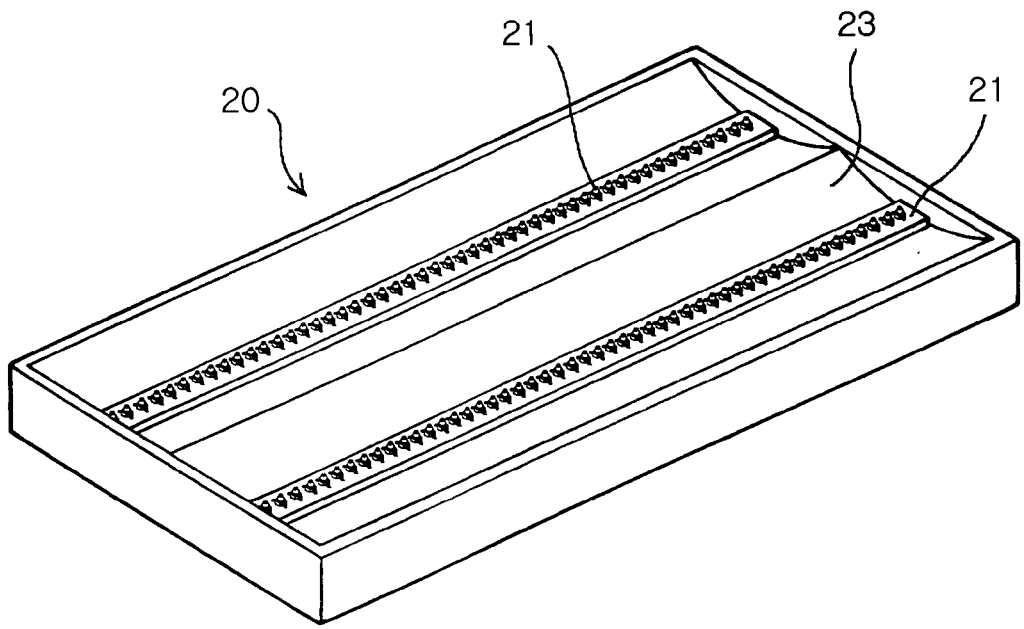
FIG. 3 is a perspective view showing a conventional backlight unit.
Figure 4:
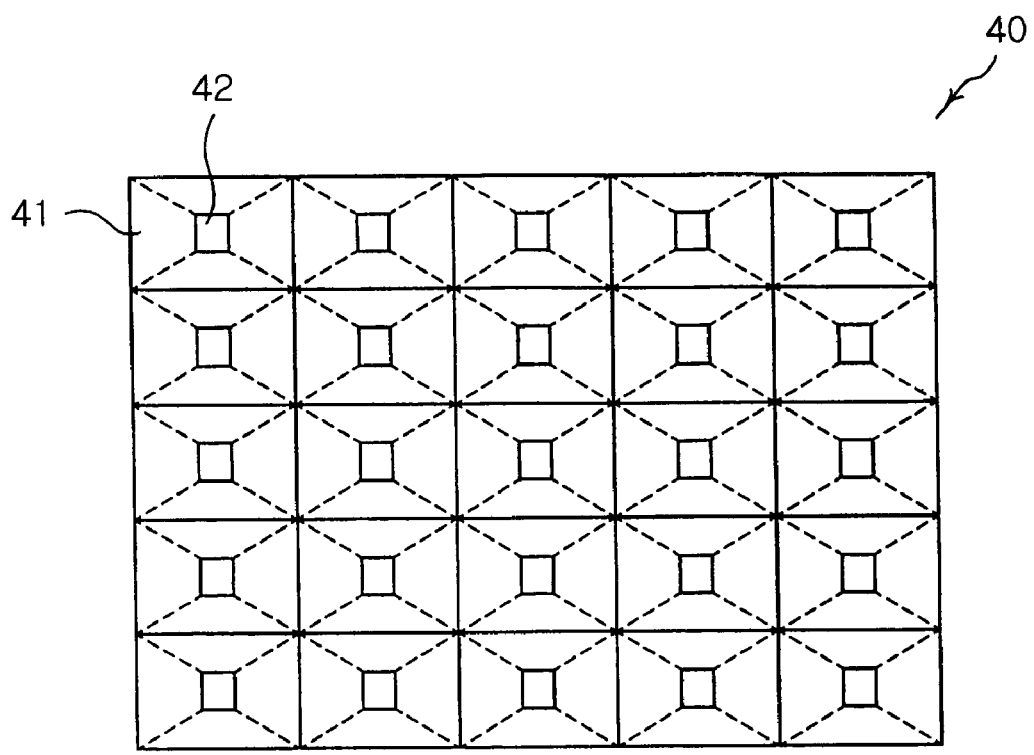
FIG. 4 is a plain view showing a backlight unit of a liquid crystal display according to the present invention.

FIG. 4 is a plain view showing a backlight unit of a liquid crystal display according to the present invention.

In FIG. 4, reference numeral 41 denotes a unit reflection cell having a cross-sectional area of semi-cylindrical shape and a unit size when a screen of an LCD is equally divided into a predetermined numbers of the unit reflection cells. Reference numeral 42 denotes a light emitting diode package for emitting light in the lateral direction, which integrally packages at least one or more red, blue and green LED chips, and is located at the center of each reflection cell.

Here, the backlight unit 40 may be achieved by producing a plurality of unit modules, each of which is formed by integrally connecting one light emitting diode package 42 and one reflection cell 41, followed by connecting the plurality of unit modules to each other in a matrix. Alternatively, the backlight unit 40 may be achieved by producing a reflection plate, which is formed by integrally connecting the plurality of reflection cells 41 in a matrix, and then by mounting a plurality of light emitting diode packages 42 at the center of the respective reflection cells 41.

The reflection cell 41 has a predetermined unit size, which may be adequately determined such that the reflection cell having the unit size can be commonly applied to an LCD screen to be manufactured. As a result, the number of the reflection cells 41 may be determined according to the size of the LCD, thereby realizing the backlight unit 40, which can be applied to any size of LCD.

Figure 5:
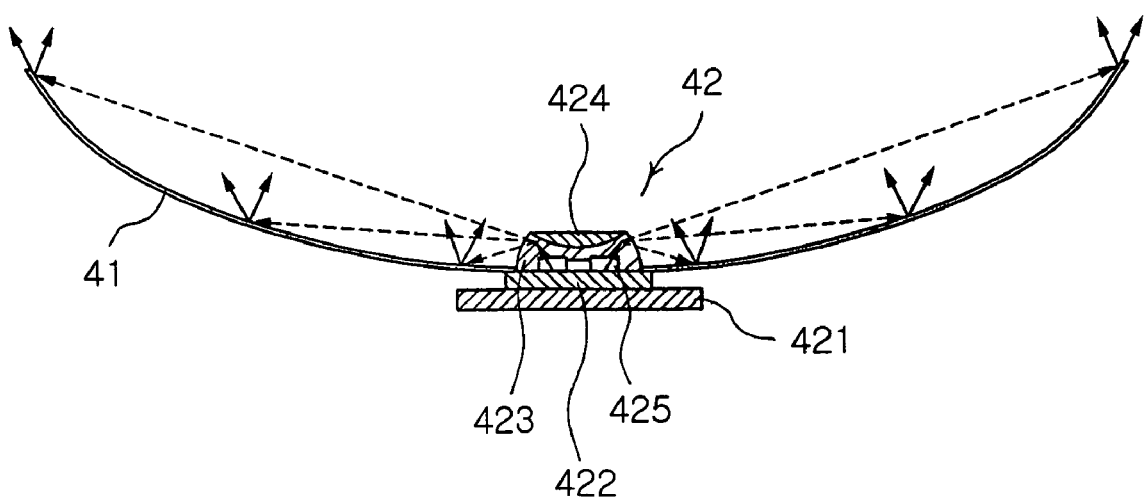
FIG. 5 is a cross sectional view showing a unit reflection cell of the backlight unit according to the present invention.

FIG. 5 is a detailed cross sectional view illustrating a unit structure of the backlight unit 40 shown in FIG. 4.

As shown in FIG. 5, the reflection cell 41 is formed with a reflective surface with a cross sectional area of a semi-spherical shape, and is formed with a hole at the center of the reflection cell 41, through which the reflection cell 41 can be easily coupled to the light emitting diode package 42. The light emitted from the light emitting diode package 42 in the lateral direction is totally reflected at the reflective surface of the reflection cell 41, and the light totally reflected in the perpendicular direction is discharged to the outside.

The light emitting diode package 42 is made of a material having a high thermal conductivity, such as aluminum. The light emitting diode package 42 comprises a PCB 421 with a conductive pattern for transmitting power formed thereon, a base 422 located on the PCB 421 and having a bonding pad and a heat dissipating structure for a plurality of LED chips; a plurality of LED chips 425 mounted on the base 422 and electrically connected to the conductive pattern of the PCB 421; and a lens 423 formed on the base for changing the path of the light generated in any direction from the plurality of LED chips 425 to the horizontal direction.

In order to prevent the light from being emitted directly in the perpendicular direction, the lens of the light emitting diode package 42 is formed with a reflective surface 424 having a semi-spherical surface shape at an upper portion of the lens in the perpendicular direction from the plurality of light emitting diode chips 425. The reflective surface 424 may be achieved by coating a reflective material on the upper portion of the lens.

The reflective surface 424 acts to reflect the light emitted from the plurality of LED chips 425 in the perpendicular direction to the lateral direction of the lens 423. Accordingly, the light is completely prevented from being emitted from the light emitting diode package 42 directly in the perpendicular direction.

Moreover, the backlight unit enables the colors provided on the LCD panel to appear more clearly by radiating white light from the underneath of an LCD panel. In order to provide the white light, the backlight unit may be provided with the plurality of LED chips 425, each of which is a white light emitting diode. Alternatively, the plurality of LED chips 425 may be realized by a combination of red, blue and green light emitting diodes. In this case, the three primary colors, that is, red, blue and green colors are mixed, producing the white light. That is, according to the principle of mixing of light, when complementary colors are mixed, white light is produced. Accordingly, the plurality of LED chips 425 may be provided by a combination of the LEDs, which generate complementary colors. For instance, when using the combination of a blue LED and a green LED, which are in relations of the complementary colors, blue light and green light is mixed, producing white light, and when using the combination of a yellow LED and a blue LED, which are complementary colors, yellow light and blue light is mixed, producing white light.

In the above description, in the case where the plurality of LED chips are realized by the white LEDs, the path of the white light generated from the LED chips 425 is changed to the horizontal direction, and is then again changed to the perpendicular direction, irradiating the rear side of the LCD panel.

On the contrary, in the case where the plurality of LED chips are realized by the combination of the red, blue, and green LEDs or by the combination of the LEDs for generating the complimentary colors, complementary colors generated by the plurality of LED chips 425 are mixed together while being subjected to total reflection and refraction inside the lens, thereby generating white light. White light, which is produced by mixing red, blue and green light, is emitted in the horizontal direction to the outside of the lens 423, and is then emitted in the perpendicular direction at the reflective plane 425. In this case, as the white light is produced by sufficiently mixing the red, blue and green light inside the light emitting diode package 42, the backlight unit 40 is not required to have a high thickness for mixing the colors, thereby reducing the thickness of the backlight unit.

As apparent from the above description, since the backlight unit of the present invention comprises the predetermined sized cells combined in a matrix, and can be realized by adjusting the number of the cells according to the size of the LCD, it is unnecessary to redesign the reflection plate, the PCB, and the like, depending on the size of the LCD, and since the cell can be commonly applicable to any size of LCD, it is efficient. Further, the light emitting diode package of the backlight unit can be realized not only by the white LED chips but also by the combination of the red, blue and green LED chips. Particularly, since the red, blue and green light is mixed in the light emitting diode package to produce the white light, the space for mixing colors is reduced, decreasing the thickness of the LCD. Moreover, the light emitted from the LED chips directly in the perpendicular direction is completely shielded, preventing the hot spot from being generated, thereby making it unnecessary to provide the separate sheet for preventing the hot spot.

It should be understood that the embodiments and the accompanying drawings as described above have been described for illustrative purposes and the present invention is limited only by the following claims. Further, those skilled in the art will appreciate that various modifications, additions and substitutions are allowed without departing from the scope and spirit of the invention as set forth in the accompanying claims.

What is claimed is:

1. A backlight unit of a liquid crystal display, comprising:
    a plurality of light emitting diode packages arranged in a matrix while being spaced a uniform distance apart from each other, each of said light emitting diode packages including one or more light emitting diode chips and being structured such that light generated from the one or more light emitting diode chips is emitted in the horizontal direction; and
    a reflector comprising a plurality of reflection cells connected to each other in a matrix, wherein each of the reflection cells has one of the light emitting diode packages positioned at the center thereof, and reflects the light, emitted from the light emitting diode package at the center thereof in the horizontal direction, in the vertical direction;
    wherein each of the light emitting diode packages comprises:
    a printed circuit board with a conductive pattern for transmitting power formed thereon;
    a base located on the printed circuit board and having a heat dissipation function for transmitting heat to the printed circuit board;
    the one or more light emitting diode chips mounted on the base and electrically connected to the conductive pattern of the printed circuit board; and
    a lens formed on the base in order to change a path of the light, generated from the one or more light emitting diode chips, to the horizontal direction.

2. The backlight unit as set forth in claim 1, wherein each of the reflection cells of the reflector is formed, at the center thereof, with a hole having a predetermined size, and the light emitting diode package of said reflection cell is inserted into the hole.

3. The backlight unit as set forth in claim 1, wherein the one or more light emitting diode chips of each of said light emitting diode packages consist of white light emitting diodes.

4. The backlight unit as set forth in claim 1, wherein the one or more light emitting diode chips of each of said light emitting diode packages consist of a combination of light emitting diodes emitting light of complementary colors.

5. The backlight unit as set forth in claim 1, wherein the lens comprises a reflective surface having a spherical surface shape, at an upper portion of the lens in the vertical direction above the one or more light emitting diode chips, and said reflective surface reflecting the light, emitted from the one or more light emitting diode chips in the vertical direction, in the horizontal direction.

6. The backlight unit as set forth in claim 5, wherein the reflective surface of the lens is defined by a reflective material coating on an upper surface of the lens, said upper surface having the spherical surface shape.

7. A backlight unit of a liquid crystal display, comprising a plurality of unit backlight cells connected to each other in a matrix, each of the plurality of unit backlight cells integrally comprising:

a printed circuit board having a conductive pattern for transmitting power formed thereon;

one or more light emitting diode chips electrically connected to the conductive pattern on the printed circuit board;

a lens for changing a path of light generated from the one or more light emitting diode chips to the horizontal direction; and a reflector formed to surround the lens and having a unit size for reflecting the light refracted into the horizontal direction by the lens in the vertical direction.

8. The backlight unit as set forth in claim 7, wherein the lens comprises a reflective surface having a spherical surface shape, at an upper portion of the lens in the vertical direction above the one or more light emitting diode chips, and said reflective surface reflecting the light, emitted from the one or more light emitting diode chips in the vertical direction, in the horizontal direction.

9. The backlight unit as set forth in claim 8, wherein the reflective surface of the lens is defined by a reflective material coating on an upper surface of the lens, said upper surface having the spherical surface shape.

10. The backlight unit as set forth in claim 7, wherein the one or more light emitting diode chips consist of white light emitting diodes.

11. The backlight unit as set forth in claim 7, wherein the one or more light emitting diode chips consist of a combination of light emitting diodes emitting light of complementary colors.

* * * * *